July 20, 1937.　　　M. B. SAWYER　　　2,087,304
TIRE SUPPORTING STAND
Filed Nov. 29, 1933　　　2 Sheets-Sheet 2
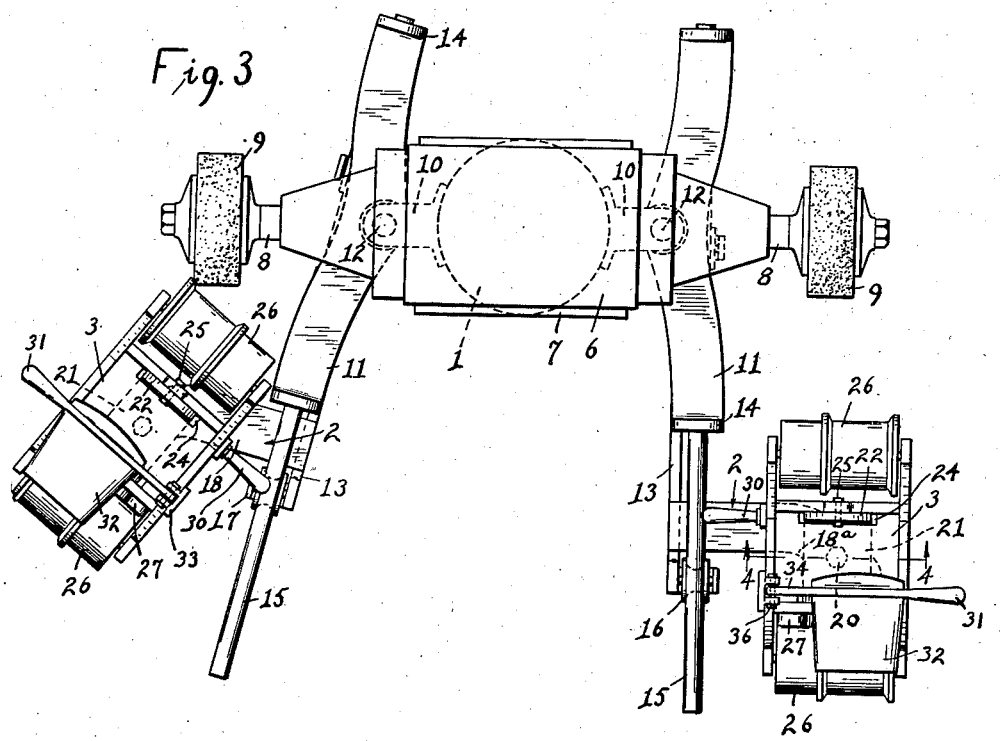
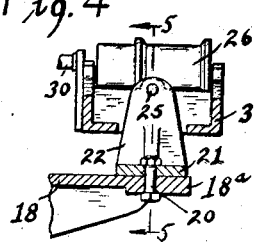
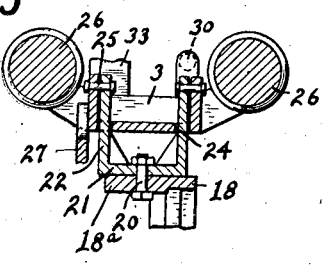
INVENTOR.
MARION B. SAWYER
BY
ATTORNEY.

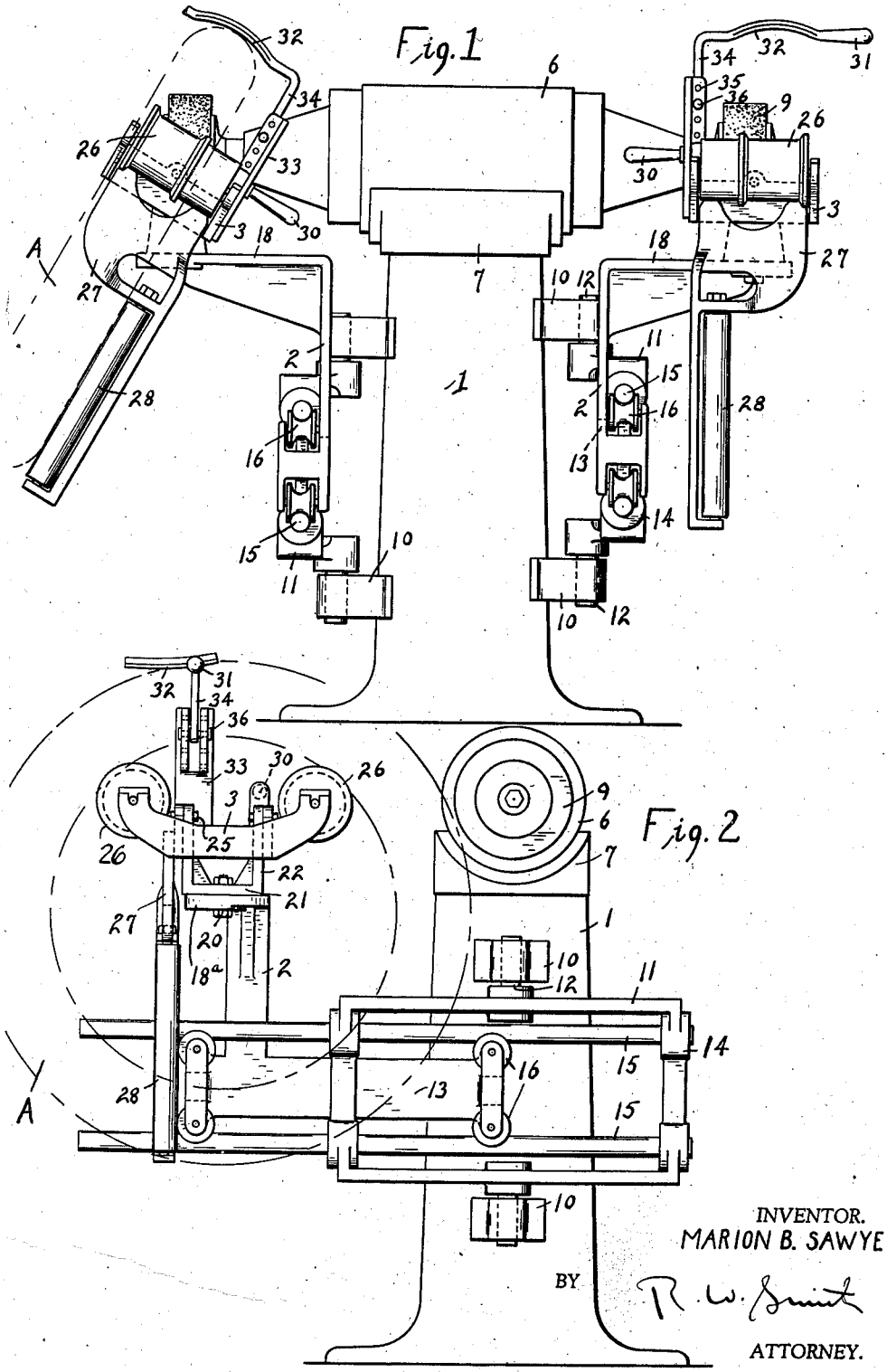

Patented July 20, 1937

2,087,304

UNITED STATES PATENT OFFICE 2,087,304

TIRE SUPPORTING STAND

Marion B. Sawyer, Los Angeles, Calif.

Application November 29, 1933, Serial No. 700,321

19 Claims. (Cl. 51—236)

This invention is a stand for supporting tires while rebuilding the same, and is particularly applicable to a stand for holding tires in operative relation to the buffing and rasping discs of a usual grinder for preparing tires for retreading.

It is the object of the invention to adapt a tire supporting saddle for movement so that the entire surface of a tire is readily accessible, and more particularly to mount the saddle with relation to a grinder so that the saddle may be readily shifted to positions presenting a tire to the grinder discs for removing the old rubber all the way down to the bead.

It is a further object of the invention to not only adjust the supporting saddle in a horizontal plane but also adapt it for tilting from the horizontal so that the side walls as well as the tread of a tire may be presented to a grinding disc for contact thereby all the way down to the bead of the tire.

It is a still further object of the invention to provide a simplified mounting for the supporting saddle, comprising a bracket adapted for both circumferential and radial adjustment and having the supporting saddle swiveled on a vertical axis relative thereto, with the saddle also adapted for tilting on a horizontal axis relative to the bracket.

It is a still further object of the invention to provide convenient handle means whereby the operator may readily adjust and tilt the saddle and may also control revolution of a tire on the saddle while it is in contact with a grinding disc.

It is a still further object of the invention to mount a supporting saddle at each of opposite sides of a central pedestal so that when the pedestal forms a support for a grinder having a grinding disc at each end of a transverse drive shaft, one of the supporting saddles will be available for each grinding disc, with the pair of saddles so mounted as to permit their respective adjustment without interfering with one another.

Further objects of the invention will be readily understood from the following description of the accompanying drawings, in which:

Fig. 1 is a front elevation of the invention.
Fig. 2 is a side view of the same.
Fig. 3 is a plan view.
Fig. 4 is a vertical section on the line 4—4 of Fig. 3.
Fig. 5 is a vertical section on the line 5—5 of Fig. 4.

The tire supporting stand comprises a pedestal 1 with a bracket 2 mounted thereon for circumferential and radial adjustment in a horizontal plane, and having a tire supporting saddle 3 swiveled on the bracket on a vertical axis and adapted for tilting relative to the bracket on a horizontal axis.

In the illustrated embodiment the saddle 3 is adapted to support a tire for contact by a grinding disc of a usual grinder; and as an instance of this arrangement the pedestal 1 may be the usual pedestal of a grinder supporting a motor 6 in a cradle 7, with the horizontal drive shaft of the motor preferably projecting laterally from opposite sides of the pedestal as shown at 8 and adapted to have a grinding disc 9 mounted on each end of the drive shaft. The bracket 2 for the supporting saddle is mounted on the side of pedestal 1 so that the saddle 3 may be adjusted relative to the grinding disc 9 which is at the same side of the pedestal, and one of the brackets 2 with a saddle 3 carried thereby is preferably mounted at each side of pedestal 1 so as to provide a supporting saddle for cooperation with each of the discs 9.

The bracket 2 is adapted for circumferential adjustment in a horizontal plane, and for this purpose vertically spaced bearing lugs 10 may project from the side of pedestal 1 and a horizontally elongated frame 11 which carries the bracket 2 is mounted between the lugs 10 and is journaled therein medially of its length as shown at 12. The bracket 2 is also adapted for radial adjustment of its circumferential travel, and for this purpose the bracket 2 projects upwardly from a carriage 13 which is slidable in the horizontally elongated frame 11.

Anti-friction bearings are preferably provided for the sliding carriage. As an instance of this arrangement the ends of frame 11 may form collars 14 adapted to receive upper and lower guide rods 15 which preferably project forwardly from frame 11, and rollers 16 are journaled in brackets 17 which are a part of carriage 13, and engage the upper and lower rods 15 for supporting the carriage for sliding movement along the rods.

The saddle 3 is swiveled on the bracket 2 on a vertical axis, and for this purpose the upper end of the bracket may project laterally as shown at 18 and terminate in a horizontal seat 18ª which is preferably elongated at an angle to the direction of reciprocation of carriage 3 as shown at Fig. 3. A bolt 20 projects upwardly from seat 18ª and a supporting base 21 for the saddle 3 is swiveled on the bolt.

The saddle is adapted to tilt on a horizontal axis, and for this purpose the base 21 is shown as a U-frame having upwardly projecting arms 22; and the frame of the saddle which has elongated transverse slots 24 in its base, is adapted for projection of the arms 22 through these slots with the front and rear walls of the saddle frame pivoted to the arms as shown at 25. The saddle is thus pivotally suspended for lateral tilting relative to the swiveled base 21.

A pair of tire supporting rollers 26 are journaled in the frame of the saddle on parallel horizontal axes extending transversely of the frame; and the lower portion of a tire A which is supported on the pair of rollers is adapted for lateral engagement with a depending abutment at the supporting saddle so that when the saddle is tilted as shown at the left of Fig. 1, the tire will be supported in a corresponding tilted position. The depending abutment is shown as a bracket 27 suspended from the front wall of the frame of the saddle and having a vertical roller 28 journaled in the bracket in position for engagement by the lower portion of a tire.

The saddle 3 is thus adapted for circumferential adjustment relative to pedestal 1 by swinging the frame 11 on the axis 12, with the radius of this circumferential travel readily adjusted by sliding the carriage 13 back and forth on frame 11 and with the saddle swiveled relative to its supporting bracket on the vertical axis 20, these various adjustments being shown at the left of Fig. 3; and the saddle is also adapted for tilting on the horizontal axis 25 as shown at the left of Fig. 1. By employing these various adjustments either singly or in any selected combination the saddle may be readily positioned so that a tire supported thereon may have any portion of its surface brought into contact with grinding disc 9, so that the old rubber may be removed at the tread and all the way down the side walls of the tire to its bead.

Means are provided for readily manually adjusting the saddle and also controlling revolution of a tire on the supporting rollers 26 in order to maintain any desired portion of the tire in contact with grinding disc 9; and for this purpose the frame of the saddle has a handle 30 projecting therefrom at the same side at which the vertical roller 28 is positioned, so that downward pressure on the handle tilts the saddle in the direction for supporting a tire in tilted position resting against roller 28 as shown at the left of Fig. 1, and a second handle 31 is connected to a brake shoe 32 which is adapted to hold the tire against rollers 26 and control its revolution on the saddle when in contact with the grinding disc. The brake shoe may be supported by a standard 33 which projects upwardly from the frame of the saddle at the same side as the handle 30, with the brake shoe mounted on a lever 34 which is fulcrumed at one end on the standard 33 and which forms the handle 31 at its opposite end. The lever 34 is preferably adjustable along the standard 33 for adapting the brake shoe to different size tires, and for this purpose a plurality of vertically spaced bearings 35 may be formed in the standard, adapted for selective reception of a bearing pin 36 on which the lever is fulcrumed.

By the construction as thus described the handles 30—31 project from opposite sides of the saddle so that they may be gripped by the respective hands of the operator for conveniently adjusting the position of the saddle and controlling revolution of a tire with relation to the grinding disc 9, in order that any desired portion of the tire may be held in contact with the grinding disc. Furthermore the brake shoe 32 is preferably positioned so that it overlies the rear roller 26 as shown at Fig. 3, so that when the brake shoe is held against the tire for arresting its revolution against the disc 9, the brake shoe will hold the tire down against the rear roller, thereby counteracting the tendency of the rotating grinding disc to tilt the tire on the front roller.

To insure ready adjustment of the supporting saddle at each side of the pedestal 1 without the supporting rods 15 for the respective brackets 2 interfering with one another when the frames 11 are swung on their pivots 12, the lugs 10 at opposite sides of pedestal 1 are preferably vertically offset as shown at Fig. 1 so that the rods 15 at the respective sides of the pedestal will vertically clear one another.

The invention thus provides for convenient manually controlled adjustment of a tire supporting saddle, both in a horizontal plane and by tilting from the horizontal, so that any portion of the surface of a tire which is supported on the saddle may be readily accessible, particularly for bringing it into contact with a grinding disc.

I claim:

1. In combination, a tire supporting saddle, means supporting the saddle for tilting movement, a shoe carried by the saddle for engaging a tire supported on the saddle, a handle for the shoe projecting beyond the side of the saddle, and a handle for tilting the saddle projecting from its opposite side.

2. In combination, a tire supporting saddle, means pivotally supporting the saddle, a shoe carried by the saddle for engaging a tire supported on the saddle, a handle for the shoe projecting beyond a side of the saddle, and a handle projecting from the opposite side of the saddle for turning the saddle on its pivotal support.

3. In combination, a support adapted for non-tiltable mounting on a surface, a saddle tiltable relative to the support on an axis other than a vertical axis and adapted to support a tire at horizontally spaced points above the center of the tire, with the lower portion of the tire depending from the saddle, and an abutment depending from the saddle and adapted for lateral engagement by the outer surface of a side of the depending portion of the tire.

4. In combination, a support, a saddle, means for mounting the saddle for adjustment relative to the support, a shoe carried by the saddle for engaging a tire supported by the saddle, a handle for the shoe, and a handle for the saddle, said handles projecting in opposite directions from the saddle.

5. In combination, a support, a frame adjustable relative to the support in a horizontal plane, a saddle for supporting a tire at points spaced circumferentially of the tire, and means for mounting the saddle for turning relative to the adjustable frame about a pivotal axis, and irrespective of the position to which the saddle is turned relative to the adjustable frame permitting the saddle to be tilted relative to the adjustable frame about an axis angularly disposed relative to the pivotal axis and in a plane other than parallel to a line connecting said circumferentially spaced points.

6. In combination, a support, a frame adjustable relative to the support in a horizontal plane, a saddle for supporting a tire at points spaced circumferentially of the tire, and means for mounting the saddle for turning relative to the adjustable frame about a pivotal axis, and irrespective of the position to which the saddle is turned relative to the adjustable frame permitting the saddle to be tilted relative to the adjustable frame about an axis angularly disposed relative to the pivotal axis and in a plane perpendicular to a line connecting said circumferentially spaced points.

7. In combination, a support, a frame, a pivotal connection between the support and the frame, the frame having guide means extending in opposite directions beyond the pivotal connection, a carriage slidable relative to the frame and engaging the guide means along such length thereof that when the carriage is at one limit of its adjustment relative to the frame it engages the portions of the guide means extending in opposite directions beyond the pivotal connection, and a tire supporting saddle on the carriage.

8. In combination, a support, a frame, a vertical pivotal connection between the support and the frame, the frame having guide means extending in opposite directions horizontally beyond the vertical pivotal connection, a carriage movable along the guide means and engaging the guide means along such length thereof that when the carriage is at a limit of its adjustment relative to the guide means it engages the portions of the guide means extending in opposite directions beyond the pivotal connection, a bracket on the carriage projecting laterally with relation to the direction of movement of the carriage, a supporting base pivoted to the bracket on a vertical axis, a saddle pivoted to the base on a horizontal axis, and tire supporting rollers journaled in the saddle on horizontally spaced parallel axes which are transverse to said horizontal axis.

9. In combination, a support, a frame, a vertical pivotal connection between the support and the frame, the frame being horizontally elongated, a carriage movable along the frame, a bracket on the carriage projecting laterally with relation to the direction of movement of the carriage, a supporting base pivoted to the bracket on a vertical axis, a saddle pivoted to the base on a horizontal axis, and tire supporting rollers journaled in the saddle on horizontally spaced parallel axes which are transverse to said horizontal axis.

10. In combination, a support, a frame, a vertical pivotal connection between the support and the frame, the frame being horizontally elongated, a carriage movable along the frame, a supporting base carried by the carriage and pivoted on a vertical axis, a saddle pivoted to the base on a horizontal axis, and tire supporting rollers journaled in the saddle on horizontally spaced parallel axes which are transverse to said horizontal axis.

11. In combination, a support, a frame, a vertical pivotal connection between the support and the frame, the frame being horizontally elongated, a carriage movable along the frame, a supporting base carried by the carriage and pivoted on a vertical axis, and a saddle pivoted to the base on a horizontal axis and supporting a tire so that it depends from the saddle with the highest point of its circumference adjacent said horizontal axis.

12. In combination, a saddle for supporting a tire in upright position with the bead of the upper portion of the tire resting upon the saddle and the remainder of the tire extending around and depending from the saddle, an abutment depending from the saddle for lateral engagement by the outer surface of a side of the lower portion of the tire, a support, and connecting means for mounting the saddle on the support for swinging movement relative thereto on an axis other than horizontal, the connecting means also permitting tilting of the saddle relative to the support on an axis other than vertical for positioning the tire in other than upright position with the abutment underlying the lower portion of the tilted tire.

13. In combination, a support, a frame adjustable relative to the support in a horizontal plane, a saddle for supporting a tire in upright position with the bead of the upper portion of the tire resting upon the saddle and the remainder of the tire extending around and depending from the saddle, and means for mounting the saddle for turning relative to the adjustable frame about a pivotal axis and irrespective of the position to which the saddle is turned relative to the adjustable frame permitting the saddle to be tilted relative to the adjustable frame about an axis angularly disposed relative to the pivotal axis for tilting the tire from its upright position.

14. In combination, a support, a frame, a vertical pivotal connection between the support and the frame, the frame having guide means extending in opposite directions horizontally beyond the vertical pivotal connection, a carriage movable along the guide means and engaging the guide means along such length thereof that when the carriage is at a limit of its adjustment relative to the guide means it engages the portions of the guide means extending in opposite directions beyond the pivotal connection, a saddle for supporting a tire in upright position with the bead of the upper portion of the tire resting upon the saddle and the remainder of the tire extending around and depending from the saddle, and means for mounting the saddle on the carriage for turning movement relative thereto on a vertical axis, said means also permitting tilting of the saddle relative to the carriage so as to tilt the tire from its upright position.

15. In combination, a support, a frame adjustable relative to the support in a horizontal plane, a saddle for supporting a tire in upright position with the bead of the upper portion of the tire resting upon the saddle and the remainder of the tire extending around and depending from the saddle, and means for mounting the saddle for turning relative to the adjustable frame about a vertical pivotal axis and irrespective of the position to which the saddle is turned relative to the adjustable frame permitting the saddle to be tilted relative to the adjustable frame about a horizontal axis for tilting the tire from its upright position.

16. In combination, a support, a frame, a vertical pivotal connection between the support and the frame, the frame having guide means extending in opposite directions horizontally beyond the vertical pivotal connection, a carriage movable along the guide means and engaging the guide means along such length thereof that when the carriage is at a limit of its adjustment relative to the guide means it engages the portions of the guide means extending in opposite directions beyond the pivotal connection, a saddle for supporting a tire in upright position with the bead of the upper portion of the tire resting upon the saddle and the remainder of the tire extending around and depending from the saddle, and means for mounting the saddle on the carriage for turning movement relative thereto on a pivotal axis and irrespective of the position to which the saddle is turned relative to the carriage permitting the saddle to be tilted relative to the carriage about an axis angularly disposed relative to the pivotal axis for tilting the tire from its upright position.

17. In combination, a support, a saddle for supporting a tire with the bead of the tire resting upon the saddle, means for mounting the saddle for adjustment relative to the support while supporting a tire, and a shoe for engaging the tread of the tire and clamping the tire against the saddle, the shoe being supported by the saddle.

18. In combination, a support, a saddle for supporting a tire, means for supporting the saddle for free pivotal adjustment relative to the support while supporting a tire, and a shoe for clamping the tire against the saddle, the shoe being supported by the saddle.

19. In combination, a support, a saddle for supporting a tire, means for mounting the saddle for adjustment relative to the support so that a tire supported by the saddle may be tilted from the vertical, and a shoe for clamping the tire against the saddle, the shoe being supported by the saddle.

MARION B. SAWYER.